United States Patent [19]
Ostrover et al.

[11] Patent Number: 6,006,273
[45] Date of Patent: Dec. 21, 1999

[54] METHOD FOR INTERLEAVING DATA FOR SEAMLESS PLAYBACK OF MULTIPLE PROGRAM VERSIONS HAVING COMMON MATERIAL

[75] Inventors: Lewis S. Ostrover, Los Angeles; Gregory B. Thagard, Redondo Beach, both of Calif.; Joseph E. Wall, III, London, United Kingdom; Christopher J. Cookson, Los Angeles, Calif.

[73] Assignee: Time Warner Entertainment Co. L.P., Burbank, Calif.

[21] Appl. No.: 08/730,328

[22] Filed: Oct. 15, 1996

Related U.S. Application Data

[63] Continuation of application No. 08/604,303, Feb. 21, 1996, Pat. No. 5,644,507.

[51] Int. Cl.$^6$ .................................................. H04N 01/413
[52] U.S. Cl. .............................. 709/247; 369/56; 369/64; 369/128; 360/39
[58] Field of Search ................................ 386/125; 369/56, 369/64, 128, 275.3, 280; 360/39; 395/277; 709/247

[56] References Cited

U.S. PATENT DOCUMENTS 5,878,387   3/1999   Oshikiri et al. ......................... 704/207

*Primary Examiner*—Thomas R. Peeso
*Attorney, Agent, or Firm*—Gottlieb, Rackman & Reisman, P.C.

[57] ABSTRACT

A method for formatting digital data on an optical disk that represents at least two versions of the same program. Data sequences which are unique to each version and data sequences which are common to the two of them are interleaved in a single data stream. In order to achieve seamless play of both versions on a player that is compatible with the disk format but has limited buffer storage, data which would otherwise be common to both versions is placed redundantly in the data sequences which are unique to both versions.

8 Claims, 9 Drawing Sheets

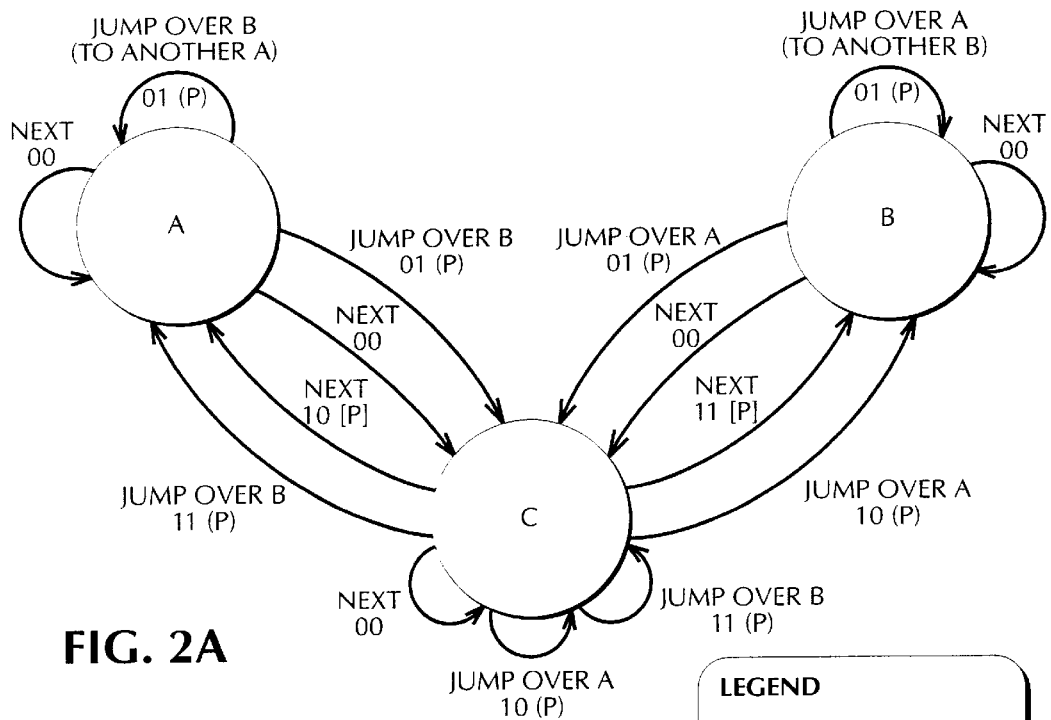

FIG. 2A

CODE
00 = Continue to next block
01 = Jump to same version or common, one pointer
10 = Branch from common:
　　Next block is an A, pointer is to a B or a C
　　(if version A is being played, continue to next block)
　　(if version B is being played, jump to block identified by pointer)
11 = Branch from common:
　　Next block is a B, pointer is to an A or a C
　　(if version A is being played, jump to block identified by pointer)
　　(if version B is being played, continue to next block)

LEGEND
10 (P) } Use Pointer P
11 (P) }
10 [P] } Ignore Pointer P
11 [P] }

FIG. 2B

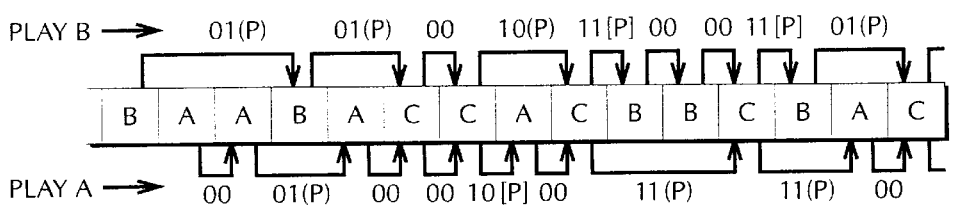

METHOD FOR INTERLEAVING DATA FOR SEAMLESS PLAYBACK OF MULTIPLE PROGRAM VERSIONS HAVING COMMON MATERIAL

This is a continuation of application Ser. No. 08/604,303, filed Feb. 21, 1996, now U.S. Pat. No. 5,644,507.

This invention relates to the play of software (e.g., motion picture) carriers, and more particularly to a method for interleaving data on a carrier that allows both versions of the same program having common material to be played seamlessly.

BACKGROUND OF THE INVENTION

In U.S. Pat. No. 5,463,565, entitled "Data Block Format for Software Carrier and Player Therefor," granted on Oct. 31, 1995 in the names of Cookson and Ostrover, which patent is hereby incorporated by reference and hereinafter referred to as the "'565 patent," there is disclosed an optical disk player that is capable of playing either of two versions of the same motion picture. The motion picture is represented on the disk as "compressed video" in the form of successive data blocks in a single track, with each block possibly containing video information, audio information, subtitle information, and the like. The '565 patent explains how a huge quantity of data can be represented on a disk no larger than the present-day audio CD. Not only is it possible to include sound tracks in multiple languages, but it is even possible to store two versions of the same motion picture, e.g., R-rated and PG-rated.

Two versions of the same motion picture usually contain a great deal of common material. This is especially true of R-rated and PG-rated versions of the same program, but the same thing applies to other examples of multiple versions (at least two) of the same program material. For example, the same disk might include teaching and testing materials, with common subject matter being included in both "versions." To minimize redundant storage of data, three types of data blocks are provided in the same track, in an interleaved fashion—blocks which contain material unique to one version, blocks which contain material unique to the other, and blocks which contain material common to both. A series of codes and pointers included in each block allow play of common blocks when either version is being played, and play of blocks of only one of the two other types depending on which version has been selected; blocks which contain data unique to the unselected version are skipped over.

When more than one version of a program is to be derived from a digital optical disk system, there may be instances where mechanical and buffer management limitations would otherwise prevent seamless derivation of the alternate versions. The term "seamless play" refers to sufficient data always being available in the necessary buffers to allow continuous play, with no apparent interruptions, even though the player read head has to skip over unselected data blocks. While the player read head is skipping over an unselected sequence of data blocks, data for the version being played is furnished by buffers which were replenished prior to the start of the jump. But if a sequence of data blocks that must be skipped is very long, then the read head may not be able to reposition itself in time to reacquire data for a particular buffer (video, audio, etc.) which has been emptied during the jump. In such a case, by the time the read head repositions itself and starts to replenish the empty buffer(s), the screen may have gone blank or the soundtrack may have stopped.

The larger the buffers, of course, the greater the amount of data that can be stored in them, and the longer the allowable time for a jump without the buffers becoming depleted. But there are practical limits to the sizes of the buffers. For example, consider a motion picture where, after common material, the play branches to either a ten-minute segment for one version or a twelve-minute segment for another, following which both versions would include some more common material. Of four successive block sequences stored on the disk, the first and last might represent common material, and the two middle sequences might represent respective versions. During play of the disk, the read head must skip over a block sequence representing either ten minutes or twelve minutes. Such a large jump may require a longer time than one or more of the buffers can sustain. In such a case, the play will not be seamless. It is not practical to avoid this problem by saying that the buffers should be larger because the additional memory may add significantly to the cost of the player and, within practical limits, there will always be some multiple version disks which just cannot be played seamlessly.

SUMMARY OF THE INVENTION

The present invention is a method for laying out, or formatting, data blocks on a disk for achieving seamless play of both versions of a program with common material. If a portion of the program to be skipped is too long, i.e., if the distance (measured in time or length) along the track over which the read head must skip is so large that the read head cannot reposition itself in time to reacquire data for the relevant buffer(s), then successive data blocks representing the two versions are chopped up into pieces and interleaved in the track. In this way, for example, when version B is being played and the A blocks have to be jumped over, the A blocks are all short enough such that when the read head exits a B block, the buffers all have enough data to allow continuous seamless play without any buffer being depleted by the time the read head positions itself at the start of the next B block.

The problem with this simple approach is that the A data blocks may be so few or so short that they just cannot replenish the buffers sufficiently to allow jumps over the respective interleaved B blocks. Worse still is the possibility that there are no A blocks at all. In other words, between two successive blocks or sequences of blocks containing common (C) material, there may be a B segment but no A segment. When playing version A, the read head must jump over the data blocks representing the entire B segment, and it just may not be possible to accomplish seamless play from one common sequence to the next common sequence when version A is being played and the B material must be skipped over.

The basic principle of our invention in such a case is to take the common material otherwise following the A material and to use it, in the example just described, for A-version data blocks. When the A version is being played, therefore, there is material that the read head can access prior to the jump over each succeeding sequence of version-B data blocks. But if common material is advanced in this way and stored interleaved with the version-B data blocks, this common material will be played as part of version A before the read head even reaches the common material, and to play the common material from its start would result in a repeat of what was just seen. For this reason, the material at the start of the common segment which is advanced and used as blocks for the A version is duplicated in blocks representing the B version, and deleted from the common material. In this way, the read head will reach the start of the remaining common material that has not yet been played no matter which version is in progress. There,is necessarily a certain data redundancy built into the disk formatting because common material, which really has to be stored only once in a common segment, is in fact not stored there and is instead stored twice—once in each of the two versions. But the slight redundancy (which does translate into a small loss in overall storage capacity) allows for seamless play of both versions no matter how long a segment of material has to be skipped during play of either version. An algorithm for controlling this "data advance" is described below. It is designed to minimize the degree of redundancy.

BRIEF DESCRIPTION OF THE DRAWINGS

Further objects, features and advantages of the invention will become apparent upon consideration of the following detailed description in conjunction with the drawing, in which:

FIGS. 2A and 2B are the same as respective FIGS. 7A and 7B in the above-identified '565 patent, with FIG. 2A being a state diagram and legend that characterizes the manner in which a disk player reads only those data blocks on a disk track that are required for the play of a selected version of a motion picture or other video presentation, and with FIG. 2B depicting the way in which one of two alternate versions can be played by following the rules illustrated by the state diagram of FIG. 2A;

DETAILED DESCRIPTION OF THE ILLUSTRATIVE EMBODIMENT OF THE INVENTION

The Problem Addressed By the Present Invention

Figure 1:
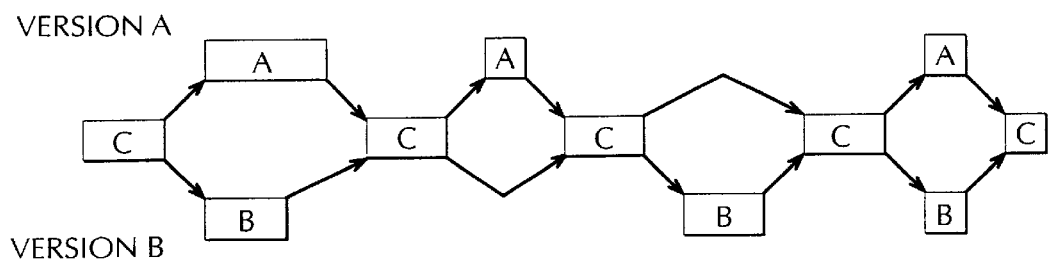
FIG. 1 depicts symbolically the kinds of jumps that are required when two versions of the same program having common material are stored in a single track.

FIG. 1 illustrates symbolically successive program segments that may have to be played when a selected one of two different versions of the same program material is to be played. As shown, there are five (C)ommon segments, all of which have to be played no matter which of the A and B versions is selected. The upper row, labeled VERSION A, shows three segments that are unique to version A. The segments that are played in sequence for this version are CACACCAC. Version B, on the other hand, requires the play of different unique segments, as depicted in the row labeled VERSION B. In this case, the correct sequence is CBCCBCBC. In both cases, the arrows show the flow from segment to segment. The C segments are common to both versions. It is the use of the common sections that greatly reduces the amount of storage that would otherwise be required for two different versions.

Although the various segments (each of which may be represented by many successive data blocks) are shown in three rows in FIG. 1, typically all segments are recorded in a single track of an optical disk or any other equivalent storage medium. The segments, or data blocks, are not stored in parallel even though for the sake of clarity they are shown this way in FIG. 1. Thus when there are alternate segments A and B between two successive C segments, as illustrated at the left end of FIG. 1 and also the right end, it is necessary to store both of the A and B segments between the two C segments. Either of the A or B segments can be stored first, as long as the A data blocks are skipped when the B version is being played, and the B version data blocks are skipped when the A version is being played. This is illustrated most clearly in FIG. 2B, a copy of FIG. 7B of the above-identified '565 patent.

FIG. 2B shows a portion of the track with successive data blocks being labelled A, B or C. It will be understood that in practice there may be thousands of data blocks in succession of the same type, with most of the data blocks on the disk being of type C. However, to illustrate the way in which the system jumps over data blocks that are not required, FIG. 2B shows at most only two blocks of the same type in succession. There are two sequences shown in FIG. 2B, one at the top for playing version B, and the other at the bottom for playing version A. If it is version B that is selected, and it is assumed that somehow the B block on the left is being played, it is apparent that the next two A blocks must be jumped over in order to go to the fourth block, a B block. After this block is played, the next A block must be jumped over. Two common C blocks are then played, after which a jump must be made over an A block to another C. The next block, a B, is then played, followed by B, C and B blocks. Finally, a jump is made over an A block to the last block shown in FIG. 2B, a C block.

If version A is being played, on the other hand, two successive A blocks are played, there is then a jump over a B block, the next five blocks—ACCAC—are played, there is next a jump over two B blocks to a C block, and finally there is a jump over another B block to an A and a following C. The pattern which emerges is that there are three kinds of transitions from one block to another. First, there is the play of a block immediately following play of the preceding block. There are seven examples of this shown in FIG. 2B—AA, BB, CC, CA, CB, AC and BC. The two possibilities which are excluded are AB and BA, since blocks unique to the two versions will never be read during the same disk play, much less one after the other. While there are seven kinds of transitions from block type to block type, there are really just three basic operations—going from one block of any type to the next adjacent block of that type; a jump from either an A to an A or C, or from a B to a B or C; or a branch from a C block either to an adjacent A or B, or to a B or A somewhere down the line. Most transitions are of the first type. The second type occurs when an A is followed by a B (which two blocks can never be played in succession); a jump must be made from the A to either another A or to a C. Similar remarks apply to a B followed by an A. The third type occurs at the end of the play of a C block, when there is no longer any common material to be played and a switch must be made to one version or the other; the next block is played if it is part of the version selected, or some blocks will have to be jumped over if the branch is to a block in the other version.

FIG. 2A shows the state diagram which defines how and when transitions are made from one block to another. Every data block includes a two-bit pointer flag, possibly followed by a field which contains a 20-bit pointer. (When a pointer is present, it always points to the serial block number of another data block.) Referring to the code given in FIG. 2A, if the two-bit pointer flag is 00, it is an indication that the processing should continue with the next block; in this case, there is no need for a pointer. If the two-bit pointer flag is a 01 code, it is an indication that a jump should be made to a block in the same version some distance away, or to a C block some distance away. In either case, a pointer is necessary.

The codes 10 and 11 are used when a branch is to be taken from a common C block. Which code is used depends on whether the next block is an A or B. If the block after the C is an A, code 10 is used and the pointer is to a B or a C further down the line. If the code is 11, it means that the next block is a B, and the pointer is to an A or a C further along the track. The operating system knows which version is being played. If version A is being played and the current block has a 10 pointer flag, it means that the next block, an A, should be played after the present one. There is no need for the pointer. The pointer is necessary in case version B is being played. In this case, since the next block is an A, it should not be played. The player should jump to the block identified by the pointer—either another C, or a B unique to version B being played.

Similarly, if version A is being played and the current block is a C with code 11 for its pointer flag, it means that the next block is a B. Since version A is being played, the next block should not be played after the current one. Instead, a jump is made to the A or C block identified by the pointer. On the other hand, if version B is being played, the system simply continues to the next block. The legend on FIG. 2A shows whether or not the pointer is used when 10 and 11 pointer flags are found in a C block. The representation 10(P) is an indication that the pointer should be used, and a representation 10[P] is an indication that the pointer should be ignored. It will be recalled that the 10 code is used for a C block when the next block is an A. If version A is being played, the pointer is not needed. That is why the transition from the C block to the succeeding block, an A, is shown by the symbol 10[P]. On the other hand, if version B is being played, since the next block is an A it cannot be played after the current C. Instead, there must be a jump to the block identified by the pointer and thus use of the representation 10(P)—the pointer points to either an A Block or another C. Similar remarks apply to the representations 11(P) and 11[P]. In both cases, it is a C block which is being played and the next block is a B. If version A is being played, the next block should not be played and thus the symbol 11(P) is required to show a state transition. On the other hand, if version B is being played, it is the succeeding B block which should be played, and thus the symbol 11[P] is appropriate.

The four codes, as well as the usages (P) and [P], are depicted in FIG. 2B. Referring to the PLAY B transition sequence, the first transition shown is 01(P). It will be recalled that the 01 code represents a jump from a block of one version to a block of the same version or to a common block, and a pointer is required. The first transition shown is 01(P), a jump from a B block to another B block. The next transition on the PLAY B line is 10(P), a jump from a B to a C. Next is an example of the most common transition of all, 00, the orderly play of the next block after the current block.

The fourth transition in the PLAY B line is represented by a 10(P) symbol. The 10 code represents a branch from a C block when the next block is an A, the example illustrated in FIG. 2B. In such a case, as indicated in FIG. 2A, if it is version B which is being played a jump is made to the block identified by the pointer—in this case, the next C.

The 11 code is used to identify a branch from a C block when the next block is a B. If version B is being played, the case under consideration, the pointer is not necessary because the next block is to be played. That is why the next code shown is 11[P]. There follow two 00 codes that represent obvious transitions to adjacent blocks, followed by a 11[P] code, a branch from a C block to the succeeding block which is a B. Finally, a jump is made from this B block over the next A block to a C block. This requires a 01(P) code, the code used to jump from a block of either version to a block of the same version or a common block.

The PLAY A sequence in FIG. 2B assumes that it is version A that is being played. The first four codes represent transitions to adjacent blocks, or a jump from a block of one version to a block in the same version. The next code, 10[P], is used to show a branch from a C block to an adjacent A block. The pointer is not used since version A is being played, and code 10 is employed because the next block is an A block. The next 00 code symbolizes the transition from the A block to a succeeding C block.

Next is a jump from a C block to another C block, skipping over two B blocks. The 11 code is used because this is the code employed when a B block follows a C block. The symbol used is 11(P), not 11[P], because the pointer is required in going from one C block to a C block further down the line. Similarly, the next code is again a 11(P) code to symbolize a branch from a C block to an A block further down the line. The sequence in FIG. 2B ends with a transition from an A block to the next block which is a C, for which the code 00 is used.

The state diagram of FIG. 2A summarizes all possibilities. Consider first the state in which an A block is being processed, represented by the circle with an A in it at the upper left. The two-bit pointer flag in an A block is 00 if the next block is also an A (shown by the transition from A back to A). If the next block is a B, on the other hand, then it clearly should not be played. There must be a jump from the A block over the B, either to another A or to a C. In either case, the code is 10(P). The drawing shows both a jump over B (to another A), and a jump over B to a C. The only other transition from an A block is to the next block if it is a C. This is shown by the code 00.

There are four similar transitions shown for state B, i.e., when a data block in version B is being read. The 00 code is used if the next block is a B or a C. The 01(P) code is used when the next block is an A, and it is jumped over so that the system can next read another B or a C.

Transitions from a C block are more complicated because there are seven of them, rather than only four as for each of the A and B blocks. If the next block is also a C, the code is a simple 00—read the next block. If the next block is an A and a jump must be made to another C, the code 10(P) controls the jump over the A. Similarly, the code 11(P) controls a jump over a B to another C. It will be recalled that these two codes are used to control branches from a C block, depending on whether the next block is an A or B. In either case, if the next block is not to be read, it (and blocks like it) must be jumped over to the next C.

However, after reading a C block, it is also possible to read an A or a B. To read an A, one of the codes 11(P) or 10[P] is used. The 11 code is employed when the next block is a B, in which case the pointer is required. The 10 code is used when the,next block is an A, in which case the pointer is not used. Similarly, to read a B block next, either the code 10(P) or 11[P] is used. The former is employed when the next block on the disk is an A, and the pointer is required because this block must be jumped over. On the other hand, if the next block is a B, the code 11 tells the system to go on to this next block, and in the process to ignore the pointer because it is not needed.

Perhaps the most important point to recognize is one which is not apparent from the drawings, and that is that most blocks will contain 00 pointer flags and no pointers. (The 00 code is the only one without a following pointer field.) That is because once a frame of either version is being displayed, or once a frame of the common material is being displayed, it is most likely that the next frame will be of the same type. Consequently, a 00 code alone does the job. The net result is that two versions of the same motion picture can be stored on the disk, with the user having the option of playing either (provided that it is allowed by any applicable parental lock), and only a tiny fraction of the total disk real estate is "wasted" by housekeeping bits that control transitions from one block to the next block which is to be read after it. This is in line with the underlying design philosophy of providing maximum flexibility and as many options as possible, without unduly wasting bits in the process.

Figure 3:
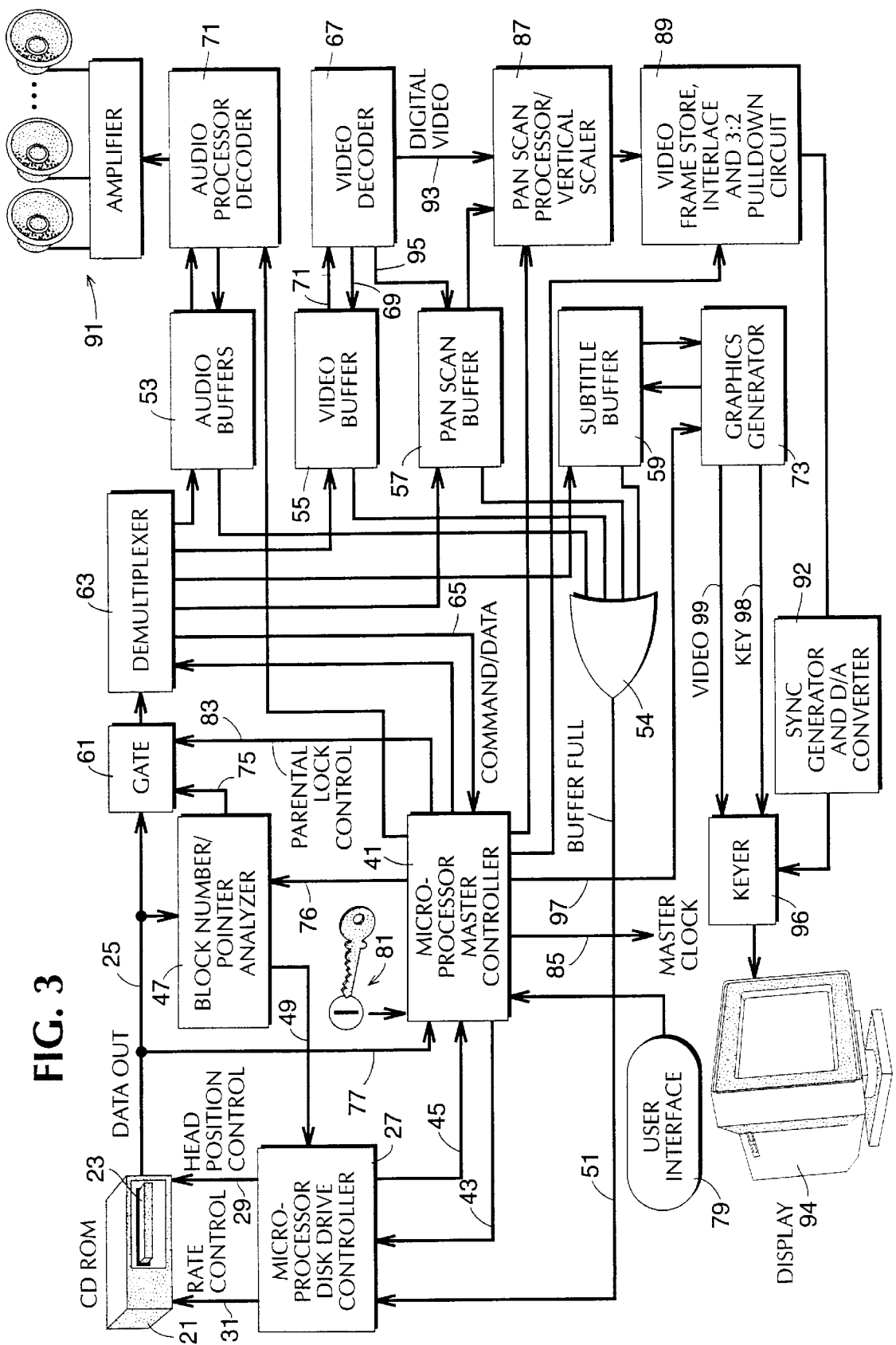
FIG. 3 is the same as FIG. 2 in the above-identified '565 patent and is a block diagram depiction of a disk player (including the several buffers whose understanding is required for an appreciation of the present invention)

The present invention is not concerned with the codes and pointers that are required to jump from a data block of one type to a data block of another. It is assumed that the necessary pointers are placed in the data blocks or in an appropriate table stored elsewhere. The present invention concerns how A-type and B-type data blocks are laid down (i.e., formatted) on the disk. In the earlier work it was assumed that it is always possible to jump from one data block to another without any interruption in the program material being seen or heard. It turns out, however, that seamless play is not always possible. To understand why this is the case, reference must be made to the elements of a typical player. The player of FIG. 3 is the same as that of FIG. 2 of the earlier patent.

For a full description of the player, reference should be made to the '565 patent. It is sufficient at this point to appreciate that information read from the data blocks is placed in respective buffers 53, 55, 57 and 59. The information is read out of the buffers at the time that it is actually processed for display or sound. Jumps over A or B data blocks are possible because, even though the read head is not reading any data while the jump is taking place, there is sufficient data in all of the buffers to allow program material to continue to be furnished. As long as the jump has concluded and the read head has settled on the proper track position before any buffer has been depleted, seamless play is possible.

Figure 4:
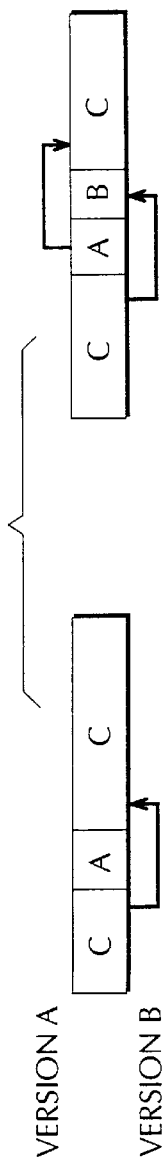
FIG. 4 is a simplified diagram along the lines of FIG. 2B, and shows two cases in which buffer capacity does not pose a problem.

FIG. 4 illustrates symbolically two simple cases for which seamless play is no problem. In one case, between two common segments there is an A segment (one or more data blocks) to be played, but no B segment. This means that in order to play version A, the three groups of data blocks are played continuously one after the other. (A rectangle labeled A, B or C in any of the drawings represents a program material segment without reference to the actual coding, or a single data block of the particular type, or a group of successive data blocks of the particular type, depending on the context.) To play version B, a jump is made over the A data blocks. As long as the A data blocks are short, the buffers are not depleted by the time the read head leaves the first C block and enters the second. The drawing on the right side of FIG. 4 shows the track layout when one of two different segments must be played depending on the version in progress. The two groups of data blocks, A and B, are stored in succession between the two common blocks. Depending on the version being played, either the A data blocks are skipped or the B data blocks are skipped. Once again, as long as each sequence is short, there is no problem in achieving seamless play.

Figure 5:
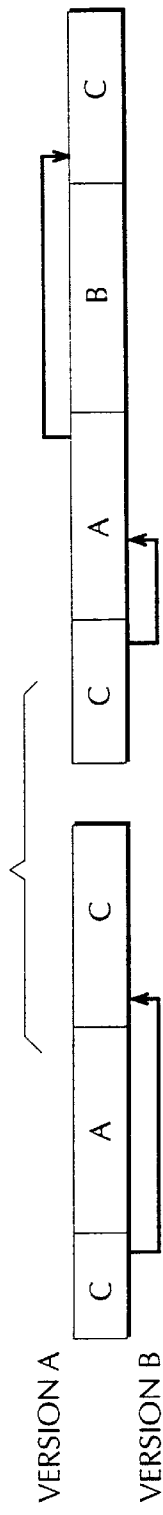
FIG. 5 is a diagram similar to that of FIG. 5 but, with relatively simple changes, illustrates how long segments can give rise to play that is not seamless.

The problem arises in the two cases shown in FIG. 5. The only difference between the comparable cases shown in FIG. 4 is that here the A segment in the first case, and the A and B segments in the second, are all much longer. It may not be possible to jump over such long segments without depleting the buffers. How long a segment can actually be jumped over without the play being interrupted depends on mechanical considerations and the buffer management system employed. For an understanding of the present invention, it is sufficient to appreciate that there is some maximum length segment which can be jumped over without an interruption in play resulting. That value necessarily depends on the players for which disks are to be formatted. The present invention assumes that there is such a maximum length, as will be defined below, and the method of the invention entails use of that value.

The Methodology For Achieving Seamless Play

Figure 6:
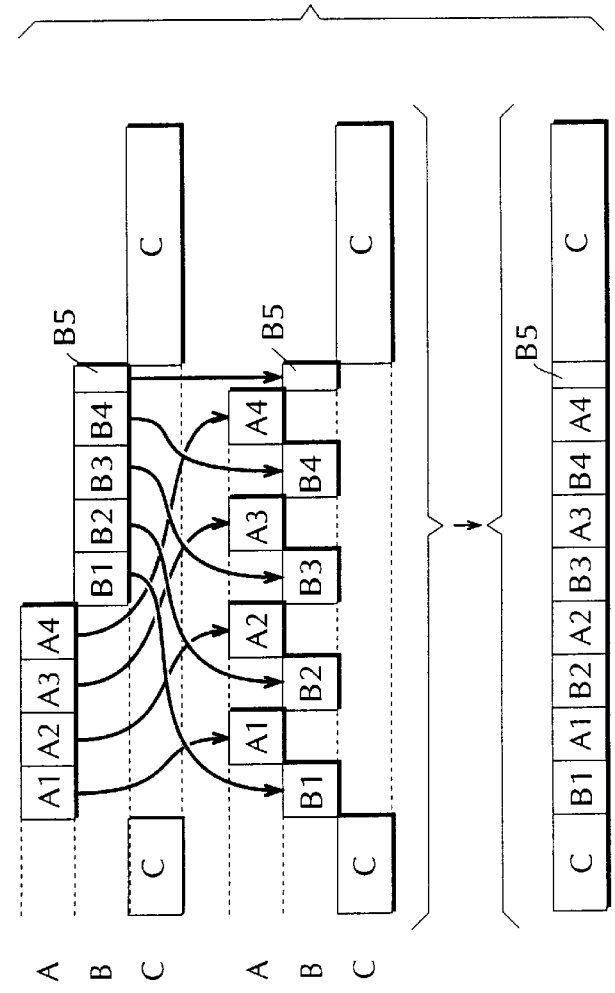
FIG. 6 illustrates the interleaving method of our invention where there is sufficient program material in both of the A and B segments between two common (C) segments.

The basic approach to achieving seamless play is shown in FIG. 6, although it will become clear that in many cases the technique shown in FIG. 6 is not sufficient by itself. The methodology is to take the A and B material (which can be thought of as program material or data blocks) between two successive common blocks, and to chop them up into smaller interleaved sections. In this way, it is never necessary to jump over a section that is so long that one or more buffers may be depleted.

The upper part of FIG. 6 shows three tracks A, B and C. Of course, there is only one track on the disk. Thus what is shown in the upper part of FIG. 6 should be treated as a time-line diagram. When playing version A, the first C block is played, then the A block, and finally the second C block. Similarly, when playing version B, the first C block is played, then the B block and finally the second C block. What gets stored in the single track, however, is not the sequence CABC. Instead, the A and B segments are divided up into many smaller segments. This is shown symbolically by the arrows in FIG. 6. The two C blocks are laid down, continuously, and between them there can be many alternating A and B blocks. The middle part of FIG. 6 is a time-line diagram comparable to that shown at the top, but with the material unique to the A and B versions shown divided up into smaller segments and interleaved. The final track lay-out is shown at the bottom of the drawing, and it is apparent that there are several alternating A and B data blocks between the two C blocks. (Again, it is to be understood that while individual "blocks" are referred to in the above description, the description applies equally to multiple data blocks. Even each of the A and B chopped-up blocks can be multiple data blocks. What is important is that each of the A and B "rectangles" include a sufficiently small amount of information, be it measured in data blocks, inches, seconds, or any other convenient parameter, that allows a jump over the block without an apparent interruption in play as the result of buffer depletion.)

The B segment is slightly longer than the A segment. This means that there may be a little piece of B-version material left over. That small section is simply placed in the track after the four A blocks. There are thus five "little" B blocks and only four "little" A blocks. The first block laid down on the track is a B block so that the four A blocks can be interleaved with the five B blocks.

The obvious problem with the simple approach of FIG. 6 is that there may not be both an A version segment and a B version segment between the two common blocks. If there is only an A segment, then there is no B material to intersperse between A blocks after the A segment is chopped up. Conversely, if there is only B material, and it is long, there is no apparent way to break up that B material with A-version blocks so that the buffers can be replenished when the A version is being played and the B material is being skipped over. The solution to the problem is shown in FIG. 7, which illustrates the basic methodology of our invention.

What is shown here is a B segment that is longer than an A segment. Obviously, the technique shown in FIG. 6 works satisfactorily even if the A and B segments are unequal in length, as long as one is not significantly longer than the other. The block lengths in FIG. 7 are not drawn to scale, and it is not intended to show typical dimensions in the drawings. The reason for this is that a very short segment of one type may provide enough data for the buffers to allow a very long jump over a segment of the other type, and there is no way to illustrate this in a practical way in a drawing. Thus when looking at the several figures, it must be understood that the block lengths are not "real" even in relative terms.

Figure 7:
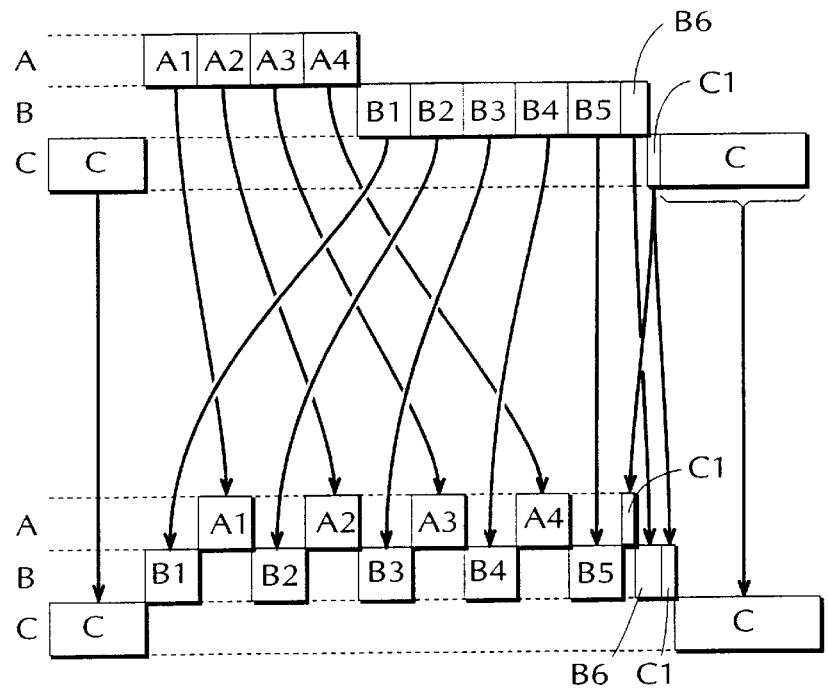
FIG. 7 is an extension of FIG. 6 but illustrates the interleaving method of our invention when one of the two segments does not have enough material to allow the necessary interleaving.

As shown in FIG. 7, the A segment is divided into four blocks, and they are interleaved with four comparable blocks derived from the longer B segment. But instead of the B segment being just a little bit longer than the A segment as in FIG. 6, with the "left over" B material following the last A block, the B material is much longer in the case of FIG. 7. A fifth B block is placed on the track after the four A blocks, this block being labeled B5 in the drawing. It is assumed that all of the blocks are as long as possible. In other words, all of the blocks shown on FIGS. 6 and 7 are maximum length in the sense that anything longer will result in play that is not seamless. As shown in the drawing there is a bit more B material left over, but it cannot be stored as part of block B5 because this would result in a total length which cannot be jumped over without possible depletion of one or more buffers.

The remaining material in the B segment is laid down in the track as shown by block B6. But in order for block B6 to be skipped over after block B5 when version A is being played, there must be some A-type material stored in an A block between blocks B5 and B6. This material is necessary for the read head to read in order to replenish the buffers prior to the jump over block B6. The problem is that there is no A material left because it has all been used up in laying down the four blocks at the beginning of the interleaved sequence.

For this reason, what is placed between blocks B5 and B6 for reading during play of version A is a block of material C1 taken from the beginning of the common material on the right side of the drawing. This common material must be read during play of both versions, so there is no problem in advancing it and placing it after the A blocks before the common material is actually reached. The material is simply picked up by the read head when the A version is being played before the common material would otherwise be reached.

However, if common material C1 is advanced and placed between blocks B5 and B6, and this material is read during play of the A version before the common segment is reached, it should not be read again in the C segment because that would result in duplicate play of the same material. Therefore, material C1 has to be deleted from the common material. But if it is deleted from the common material, then it will not be read when the B version is being played because the B version still requires that all of the common material be read. The solution is to take the material designated C1 and to advance it not just once, but twice. The material is placed in the block sequence that is read during play of the A version, as just described, and also in the block sequence that is unique to version B. That is why the C1 block is shown immediately after block B6 in the data block sequence that is unique for version B. In this way, the C1 material is read as part of the unique A sequence and the unique B sequence. Since it is read in both of the unique sequences, it is no longer necessary to include it in the common material that is formatted on the disk. For this reason, as shown at the bottom right of FIG. 7, the last part of the overall track segment illustrated is the "remainder" so the common material—the original C segment, less C1.

In a sense, the invention can be thought of as introducing "lily pads" on which the read head can "land" but immediately leave at the beginning of the jump to the next lily pad. Block C1 in the A-block sequence is such a lily pad. It can be very short in that it must provide only enough data for the buffers to allow a jump over the succeeding block in the B version. Each lily pad should be as short as possible because, since it is "borrowed" from the next common material and gets deleted from it, it must be duplicated in the material that is unique to the other version, and it is desired to keen the redundancy to a minimum.

Figure 8:
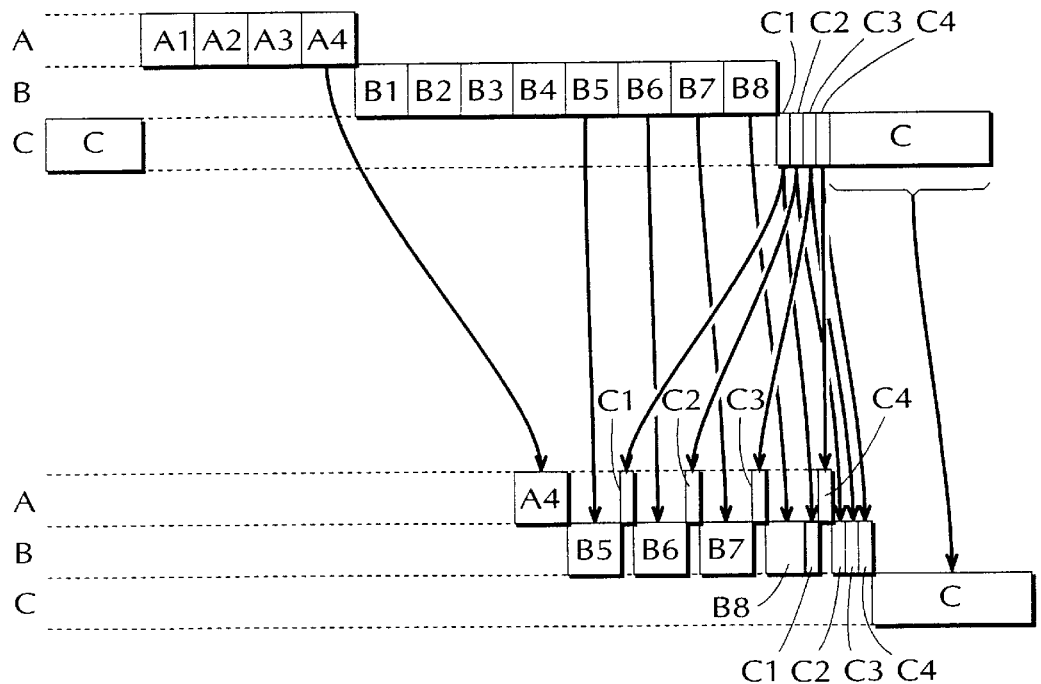
FIG. 8 is yet a further extension of the pattern of FIG. 7 and illustrates an extreme case in which common material is redundantly encoded just to allow jumps over other redundantly encoded common material.

The underlying assumption in FIG. 7 is that the C1 material which is added to the material unique to version B following block B6 is so short that B6 and C1 together do not exceed the maximum block length which, if exceeded, will prevent a seamless jump when version A is being played and the read head jumps over the B6,C1 block. FIG. 8 depicts a case (a "continuation" of FIG. 7) in which the B segment is so much longer than the A segment that many pieces of the C material must be advanced to serve as lily pads in the block sequence that is unique to version A. This, in turn, means that they must also be included in the blocks that are unique to version B, since any time common material is advanced it necessarily results in redundant recording. What remains after B5 in FIG. 7 is so long in FIG. 8 that, together with all of the advanced C blocks, the resulting B material exceeds the maximum length.

Another way of looking at the situation is that while in FIG. 7 block B6 was at the end of the material unique to version B and block C1 could be tacked on to it, this is not possible in the case of FIG. 8. Here, the B segment is so long that a maximum-size block B6 is required just for B-version material. Since all of the B segment material (including B7 and B8) must be played before the common material, it is not possible to tack block C1 on to the end of block B6. And once block B6 is recorded in the final track, another lily pad is required for play of version A. This lily pad is shown as C2, and it is placed in the final track immediately after block B6. The next part of the segment unique to version B is shown as B7, and this material is recorded on the final track immediately after lily pad C2. Still another lily pad C3, derived from the common material, is required before the last part of the B material, block B8, is laid down.

As discussed above, whatever material is advanced from the common segment and used in data blocks unique to version A must also be stored in the data blocks unique to version B. Material C1 should come immediately after material B8 when version B is played. This is shown in FIG. 8. Similarly, C2 must follow C1, and C2 could be part of the data block which includes B8 and C1, except that C2 cannot be tacked on to the block which includes B8 and C1 because to do so would give a combined block greater than the maximum length which will permit seamless play. In order to lay down material C2 (and C3) in the blocks unique to version B, it is actually necessary to introduce a fourth lily pad in the material unique to version A, material once again taken from the common material. This is shown by the small block C4. But because C4 is now advanced from the common material, the last data block for version B includes C4 following C2 and C3. Finally, the common material, less blocks C1–C4, is recorded for reading during play of both versions.

The interesting thing about the sequence of FIG. 8 is that common material C4 is recorded twice in each unique data block sequence only because it is necessary to include one last lily pad in the sequence for version A just in order to be able to record common material C2 and C3 in the material that is unique to version B. But the method of the invention does not concern itself with why common material is being taken out of a common segment and duplicated in the two unique versions. The system simply advances material whenever it is required in order to lay down a lily pad that will permit another jump. And anything recorded for one version must be recorded for the other.

Figure 9:
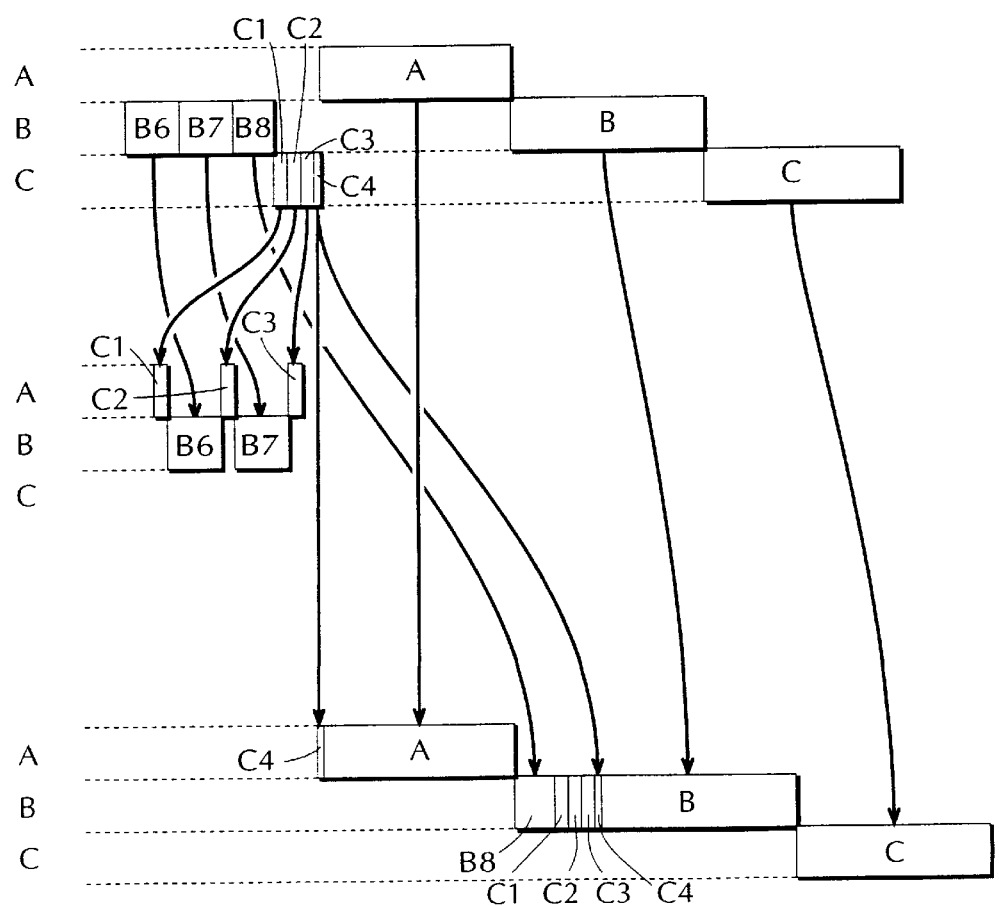
FIG. 9 illustrates a still further extension of the interleaving method of our invention and depicts an extreme case in which all of the common material in a common segment is redundantly encoded in data blocks representing the two different versions.

The last case to consider is that shown in FIG. 9. It was assumed in FIG. 8 that there was unlimited common material which could be advanced to serve as lily pads for one or both of the two versions. The last such segment in FIG. 8 was C4. But in the example of FIG. 9, the common material is much shorter and segment C4 does not even equal the minimum length required for a data block. While thus far reference has been made to the maximum length (the length beyond which a seamless jump may not be made), there is also a minimum length. Some finite time, or length, must be allowed for the data in a sequence of data blocks to at least partially load the buffers before a jump is made. [In actual practice, very small lengths may allow jumps, but the jumps may be too small to be practical. In the illustrative flow chart to be described below, the minimum length used to test "remainder" C4 is one defined as $\alpha_{opt}$ even though it is not the absolute minimum that could be used.] It is just not feasible to lay down too short a data block if it is to serve as a lily pad. Consequently, if the remaining C4 material is too short to function as a self-contained data block for version A, something else must be done with it. And the required lily-pad material must come from somewhere. What is done is shown in FIG. 9.

Following the common material of which C4 is the last piece, there is another A segment (which may have no data), another B segment (which may have no data, although at least one of the A and B segments has data), and a following C segment. The remaining piece C4 of the first common block is simply transferred to both of unique sequences A and B, and the next common material is used as the source for any other lily pads that are required.

Referring to FIG. 9, the sequence in progress (as shown, for example in FIG. 8) has no more A material left; it will be recalled that the C material is being used for each lily pad that is required in data blocks for version A. So the remaining C4 material which is common to both versions is simply added to the start of the next A material since it must be played before the next A material. This is shown at the bottom of FIG. 9 where C4 is placed before the next A material. (What is shown in FIG. 9 is not how the last three segments A, B and C are laid down on the disk, but rather how they are re-formulated before the interleaving methodology of FIGS. 6–8 is next employed.)

The same C4 material is not similarly laid down at the start of the next B segment. The reason for this is that there is still some B material in the segment being processed that has not yet been laid down on the disk. The B material which still must be processed is the tail end of the B segment which was being laid down, blocks C1–C3 which have to follow it and have not yet been laid down, then the little piece C4 which must be read after blocks C1–C3, and finally the next B segment. Thus what the system has to "work with" are three new upcoming segments—the next A segment with C4 at it start; a B segment which consists of B8, followed by C1–C4 and the next full B segment; and the following C segment. In effect, the next three segments are reconstructed not in the sense that the material is laid down on the disk as it is shown in FIG. 9, but rather in the sense that this is the material which is available for the subsequent processing of the type shown in FIGS. 6–8.

In summary, the C4 material cannot be formatted on the disk by itself because it is too short. It is apparent that it belongs at the start of the next A segment because the common material in the current segment is almost finished being processed and there is just this one last piece to include with the material that must be played for version A. As for version B, it is still necessary to process block B8 and it has already been determined that after B8 there should follow C1, C2 and C3. It is for this reason that the new "supply" for the B version, as shown on FIG. 9, consists of B8, followed by C1–C4 and finally the next B segment. What FIG. 9 is intended to show is that any material that is advanced from a common segment for recording in data blocks unique to version A (or version B, as the case may be) must be reserved for recording in the data block sequence that is unique to the other version, but it cannot be so recorded until the material remaining for that version is recorded along with the earlier advanced common data blocks.

As processing continues, eventually a point is reached at which recording of the type shown in FIG. 6 is possible and no further redundancy must be introduced. This will become apparent when the flow chart is analyzed.

Optimal and Maximum Block Lengths

Figure 10:
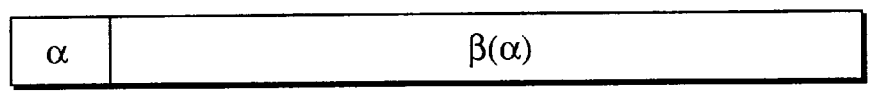
FIG. 10 illustrates the block segments represented by the terms $\alpha$ and $\beta(\alpha)$ as used in the flow charts depicting the method of the invention.

Before proceeding with the flow chart that sets forth steps for actually controlling formatting of the track, the symbols $\alpha$ and $\beta$ shown in FIG. 10 must be understood. The symbol $\alpha$ represents what has been called a lily pad. The symbol $\beta$ represents a block that has to be skipped in one version and, by reading the data contained in block $\alpha$ (in the version being played), there is material in the buffers available for play as the read head skips over section $\beta$. (Terms such as segments, blocks and sections are used interchangeably since a segment or section may be one or many blocks.)

Figure 11A:
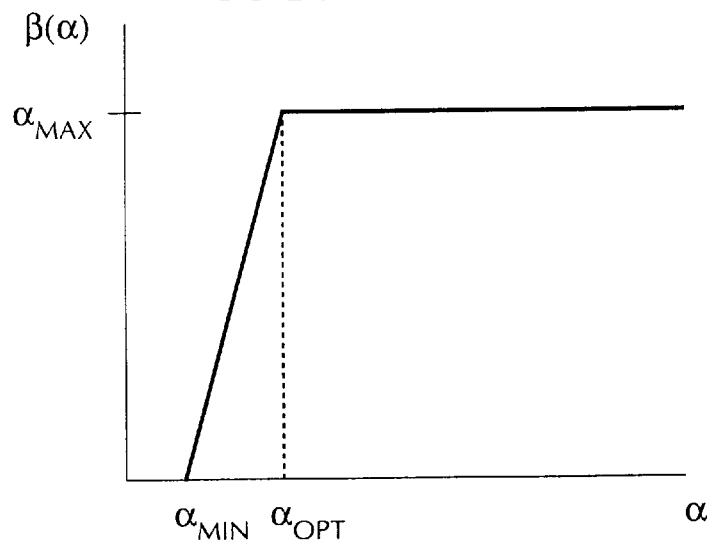
FIGS. 11A and 11B illustrate two alternative mathematical relationships between the variables $\alpha$ and $\beta(\alpha)$.

While $\alpha$ and $\beta$ are simply two successive lengths, the symbol $\beta(\alpha)$ represents the maximum length $\beta$ over which a seamless jump may be made after reading a block of length $\alpha$. Referring to FIG. 11A, if the relationship is linear, it is apparent that the longer section $\alpha$, the longer the succeeding section $\beta$ can be because there is more data available in the buffers as a result of reading more $\alpha$ data. However, even as $\alpha$ grows, $\beta$ does not grow indefinitely. That is because there is a limit to how much data can be contained in the buffers. Once they are full, that determines the longest $\beta$ segment that can be jumped over. That is why in FIG. 11A there is a maximum value for $\beta(\alpha)$ no matter how large $\alpha$ becomes. Once the buffers are full, by the time the read head leaves section $\alpha$ the length of the maximum seamless jump is determined by the capacity of the buffers.

If $\alpha$ is redundant material advanced from a C segment, there is no reason to increase $\alpha$ beyond the value at the knee of the graph which gives rise to the maximum $\beta(\alpha)$, the value of the ordinate along the horizontal line of the graph. The lowest value of $\alpha$ which gives rise to the maximum value of $\beta(\alpha)$ is a $\alpha_{opt}$. When creating a lily pad whose sole purpose is to allow a jump over the succeeding data blocks when the version containing the pad is being played, there is no reason to use a lily pad which is longer than $\alpha_{opt}$. Every lily pad introduced from common material results in redundancy, and redundancy should be minimized.

It should be noted that the maximum value of $\beta(\alpha)$ is actually shown as $\alpha_{max}$. The reason for this is that if the maximum value of $\beta(\alpha)$ represents the longest segment which can be recorded on the track for seamless play, then that same maximum length applies to either of two successive sections. Every data block of one type precedes a data block of the other type in the interleaved sequence, so that each section is both an 60 and a $\beta$. Consequently, the maximum length of a block sequence can be referred to as $\alpha_{max}$, i.e., no data block sequence unique to one version should exceed $\alpha_{max}$ in length.

Figure 11B:
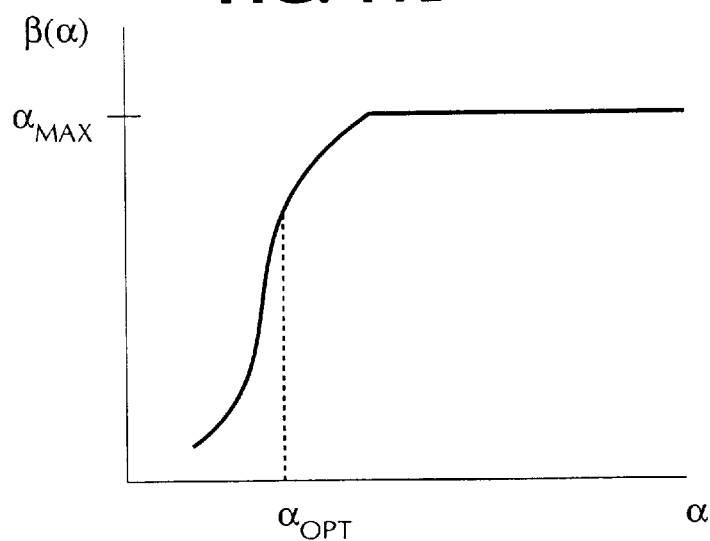

Assuming a linear relationship between $\alpha$ and $\beta$, a typical transfer characteristic is shown in FIG. 11A. As the length $\alpha$ of a data block (or data blocks) increases, the maximum length of the succeeding data block $\beta(\alpha)$ which can be jumped over increases. However, every data block is limited in length to $\alpha_{max}$. Suppose, for example, that there is much more B material that has to be placed on the track than A material before the next common material. In such a case, the goal of the interleaving is to have small A data blocks and large B data blocks. Every small A data block whose length is $\alpha$ allows a longer B data block to be recorded, the length of the B data block being $\beta(\alpha)$. The optimal length for each A data block is that which gives the largest ratio of $B(\alpha)/\alpha$. The optimal value of $\alpha$—$\alpha_{opt}$—is that which provides the maximum ratio and it is labelled in FIG. 11A. In the case of a non-linear relationship, as depicted in FIG. 11B, the value of $\alpha_{opt}$ may not necessarily be at the knee of the curve. In both cases the goal is to use successive $\alpha$ and $\beta$ lengths that maximize the ratio $\beta(\alpha_{opt})\alpha_{opt}$. Laying down the data blocks using these lengths uses up the longer version material as fast as possible while minimizing the amount of common material which may have to be advanced in order to the derive the $\alpha$ segments.

The Applicable Lists Used by the Hardware

Figure 12:
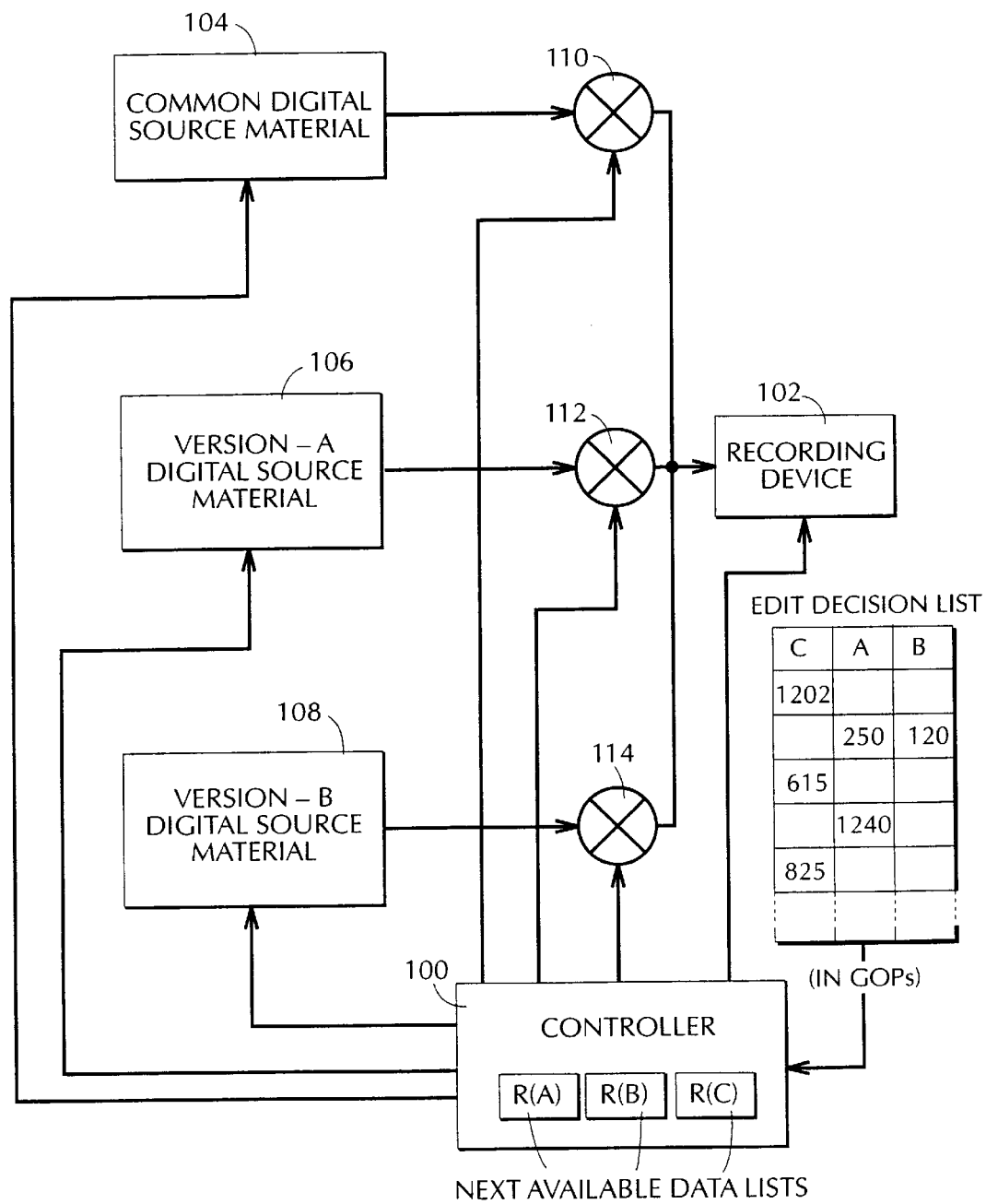
FIG. 12 illustrates a system which can implement the method of the present invention and further shows several lists and source materials to be described in detail below.

FIG. 12 illustrates how the method of our invention may be implemented. A controller 100, typically a microprocessor, directly controls a recording device 102. The input information furnished to the controller is a standard Edit Decision List which specifies the sequence (usually in Groups of Pictures, or GOPs), in unit lengths, of the series of segments required for the two versions as shown in FIG. 1. The actual digital source material for the three kinds of segments (version-A, version-B and Common) are in three digital stores 104, 106 and 108. The controller causes one of the three sources to output material to be recorded thorough the respective gate 110, 112 or 114, also under control of controller 100, for extension to recording device 102.

The controller maintains three lists which identify the next available data for each source. The lists are identified by the symbols R(A), R(B), and R(C). Each list is nothing more than the representation of a respective one of the upcoming A, B and C segments, as discussed for example, in connection with the segments shown at the bottom of FIG. 9. As will be discussed in connection with the flow chart, the three lists are updated during successive iterations. Each list at all times represents upcoming information for one of the three kinds of data that must be recorded. List R(C) includes all common material in the segment being processed, from the next material to be laid down until the end of the segment. If the system is processing A and B segments, R(C) represents the full following c segment, pieces of which may have to be "borrowed" (advanced, as discussed above). Lists R(A) and R(B) represent A and B segments being processed. If a C segment is being processed by itself, R(A) and R(B) are empty—they are updated at the end of the C segment processing when new A and B segments are reached. The controller uses the information on the Edit Decision List to update the "Next Available Data" lists R(A), R(B) and R(C). Each list identifies in the respective digital source material what data should be read out to complete recording of the segment being processed.

Figure 13A:
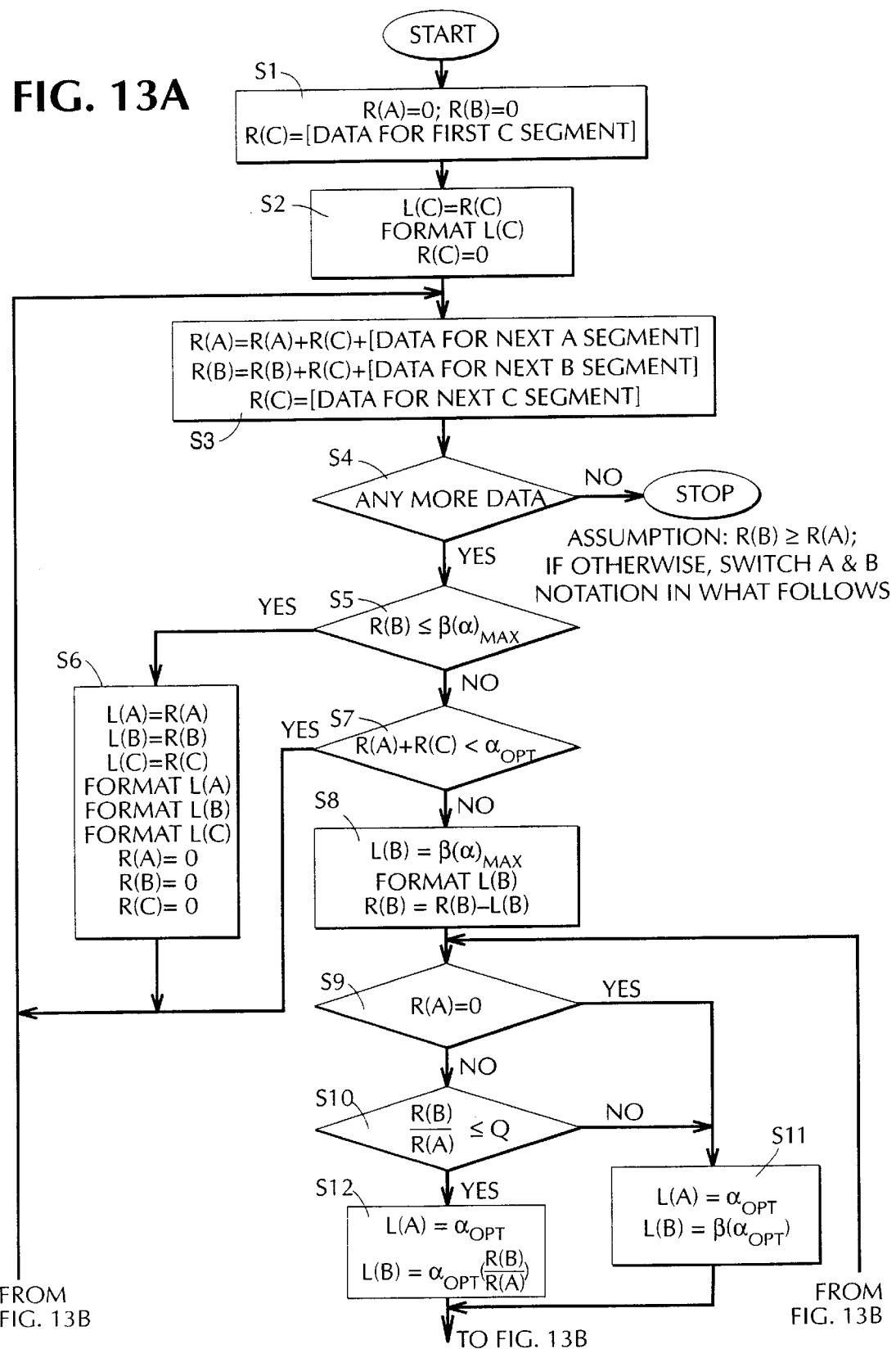
FIGS. 13A and 13B illustrate the preferred method for redundantly encoding common material to achieve seamless play of two versions of the same material.
Figure 13B:
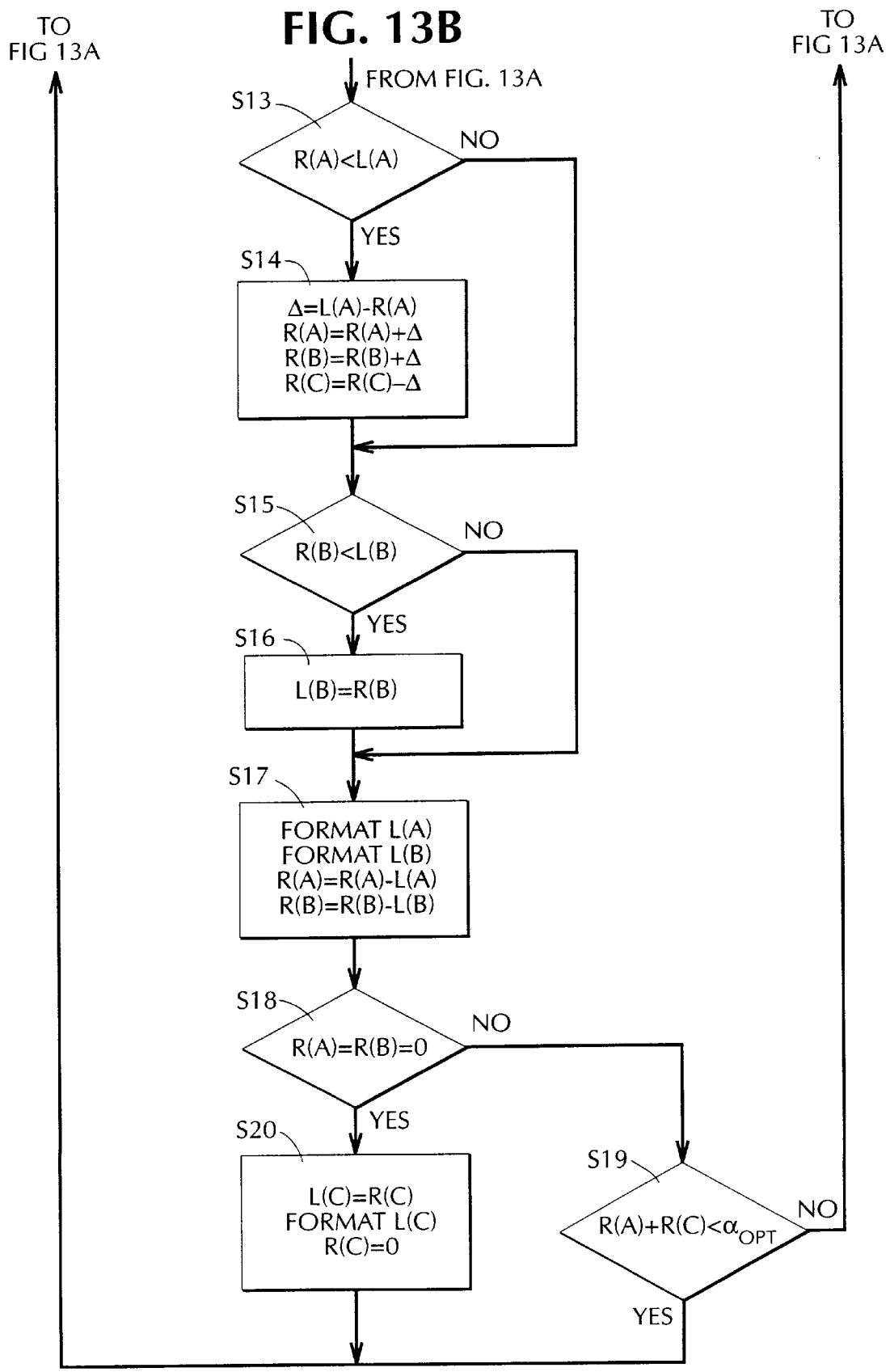

The Flow Chart of FIGS. 13A and 13B

FIGS. 13A and 13B depict the flow chart that implements the formatting discussed in connection with FIGS. 6–9. Referring to FIG. 1, at the start of any two-version motion picture, their is almost always a common segment—the title is the same in all cases. Thus, initially there is only common material with which the system has to work. The three functions R(A) R(B) and R(C), as discussed in connection with FIG. 12, represent lists of data that are immediately available. By "immediately available" is meant the data that next has to be formatted on the disk. The R(C) list includes all of the remaining data in the common segment being processed that has not yet been formatted on the disk, or the entire common segment that follows A and B segments that are now being formatted if processing of the preceding common segment has already been completed. There must always be a "supply" of common material that can be advanced in case lily pads are required, and toward this end the system keeps track in list R(C) of all or part of one common segment.

The R(A) and R(B) lists, on the other hand, can be empty. If a common segment is being laid out on the disk, there is no A and B material that has to be processed. It is only at the end of the processing of a common segment that new A and B segments become available (one of which may be non-existent, in which case its list is empty—symbolized, for example, by the notation R(A)=0). There is no need to maintain a list of the next A and B segments that must be processed until they are actually reached. There is a need to maintain an R(C) list at all times, however, even when only A and B segments are being formatted on the disk, because it may be necessary to use a piece of the following common material as a lily pad.

In step S1, since initially there is only common material to be processed, R(A) and R(B) are both set to zero. At the same time, R(C) is set equal to the data for the first common segment.

The variable L(X) where X=A, B or C, represents the data which actually will be laid down on the disk in the current iteration. (All references to laying down data on the disk can include an intermediate step of storing the formatted data on tape or in memory, and then—at a later time—actually creating a master from which copies can be made.) There are limits to how much data can be laid down; the basic premise of our invention is that for seamless play there is a limit to the length of any segment over which a jump may be necessary. But there is no limit to the length of a common segment since no jump is required over such a segment. Consequently, in step S2, L(C) is made equal to R(C)— everything that is in the first common segment is placed in list L(C), L(C) representing the data that is to be put on the disk in the current cycle. (The data itself is derived from one of the digital sources 104, 106, 108 on FIG. 12, the three respective lists simply pointing to the material which is to be processed.)

The next sub-step in step S2 is to format L(C). This simply means that the data represented in L(C) is retrieved from the respective source and placed on the disk.

Since R(C) initially represented the entire first common segment and it is all now on the disk, R(C) must be reset to 0. This is done in the last sub-step. At the end of step S2, all three lists are empty. The first two steps boil down to nothing more than formatting the first common segment, i.e., placing all of the data representing the first common segment of a motion picture on the disk using whatever codes, pointers, data block formatting, etc. is employed in the particular system under consideration.

With the three lists now empty, they must be replenished from the Edit Decision List (see FIG. 12). In step S3, the last sub-step is the easiest to understand. With processing of a common segment having just been concluding, R(C) is replenished with data for the next common segment. But there are preceding A and B segments as well. While the first time step S3 is executed there is no prior "history" to take into account, this is not always the case. This complicates what gets stored in R(A) and R(B).

Referring to FIG. 9, at the bottom is shown how the next available data lists are developed. There may be a little piece of R(C) (C4 in FIG. 9) that remains from the current C segment being processed. This piece has to be added to the R(A) and R(B) lists. Only then does the next A segment get added to R(A) and the next B segment get added to R(B). Thus, as shown in step S3, whenever the lists are updated by bringing in new segments of the program material, R(A) has added to its then "content" both the "left over" R(C) and the new material. Similar remarks apply to R(B). As for R(C), since it is now "losing" whatever was left over in it, it is simply set equal to the next C segment.

In step S4, a check is made whether there is any more data to be processed. If there is no more data, then processing stops—all of the data representing both versions of a two-hour motion picture, for example, have been placed on the disk (or, as mentioned above, in intermediate storage in the proper format and sequence). Of course, the answer to the question in step S4 will be in the negative the first time it is asked, but this step is executed just after the start of each of the succeeding iterations. Eventually, there will be no A, B and C segments left, and the processing will come to an end.

As indicated on the flow chart between steps S4 and S5, the remainder of the flow chart assumes that R(B) is greater than R(A). In other words, of two segments in different versions being processed simultaneously, it is assumed that the segment of version B is larger than that of segment A. If the reverse is true, the notation in the flow chart should be reversed. It is easier to comprehend the methodology by assuming that there is more B data than A data for the two corresponding segments in the different versions than it is to explain the methodology in more general terms. All that is required in actual practice is, after initial updating of the three lists, to include a test as to which of R(A) and R(B) is larger, and to treat the larger as R(B) in the flow chart and the smaller as R(A).

No matter what the relative lengths of R(A) and R(B), since R(B) is longer it would appear that the maximum amount of data for the B segment should be laid down at the start of each iteration. There may be so much B material that the required jumps may not allow seamless play without introducing lily pads with the concomitant redundancy, so at the start of each iteration it certainly makes sense to "get rid of" as much B material as possible. As discussed above in connection with FIGS. 10 and 11, the maximum length of a sequence of data blocks is the maximum value of $\beta(\alpha)$, which can be written as $\beta(\alpha)_{max}$ and is the same thing as $\alpha_{max}$. Accordingly, this much data from the R(B) list may be placed in L(B) for immediate lay-down. In fact, the entire segment represented in R(B) can be laid down if it does not exceed $\alpha_{max}$. This is determined in step S5. If R(B) is small enough to be formatted in its entirety, so is R(A) which is smaller. L(A) and L(B) are set respectively to R(A) and R(B). After they are formatted on the disc, the next common segment represented by R(C) can be laid down, so L(C) is set equal to R(C). All three segments are then formatted and the three lists are nulled. A return is then made to step S3 where the lists are replenished.

Sooner or later, three new segments will be processed for which the simple lay-downs of step S6 are not possible because R(B) is greater than $\beta(\alpha)_{max}$. At this point interleaving must be employed. It makes sense to format a $\beta$ block first, and of maximum length, in order to decrease any imbalance in R(A) and R(B). But if a large B block is laid down, and there is then insufficient material in R(A) for an A block, the interleaving cannot even begin. So in step S7 a test is performed to see if there is enough material available for an A block.

The question is how much material should be laid down in each block of version A. As explained above, when the B segment is much larger than the corresponding A segment, during every iteration some of the material in the next common segment is transferred to R(A) so that a lily pad can be placed on the disk for reading during play of version A. To minimize the resulting redundancy (since the lily pad gets repeated in the blocks unique to version B), as much R(B) material should be processed for as little R(A) material that has to be "borrowed." The ideal R(B)/R(A) ratio is $\beta(\alpha_{opt})/\alpha_{opt}$, called "Q" in the flow chart as will become apparent, so $\alpha_{opt}$ should be available, if needed, for an A block. Thus before the first B block of length $\beta(\alpha)$ is formatted, a check is made that enough material will be available for an A block of length $\alpha_{opt}$ that will follow the first B block of length $\beta(\alpha)_{max}$ and will precede the next B block of length $\beta(\alpha_{opt})$. [It should be noted that if the $\beta(\alpha)$ function is linear as in FIG. 11A, the first block of length $\beta(\alpha)_{max}$ is of the same length $\beta(\alpha_{opt})$ as the others.] The question is how much material is in fact available for the next A block. Referring to FIGS. 7–9, what is available for an A block is what is left in list R(A) plus whatever can be advanced (borrowed) from R(C). So in step S7, the sum is compared with the amount of data which will be required for an A block—$\alpha_{opt}$. If there is insufficient data, not even the first B block is laid down. Instead, a return is made to step S3 so that all three lists can be changed—R(A) and R(B) are both increased by the small amount of data available for the next common segment, and then they each have their next respective segments added. Since the A and B segments have been extended, R(C) is simply set equal to the next C segment.

On the other hand, if in step S7 it is determined that enough material is available (the sum of R(A) and R(C) is not less than $\alpha_{opt}$), in step S8 the first B block—of maximum length—is finally laid down, and R(B) is reduced by the amount of data thus processed.

Starting in step S9, successive iterations begin, during which A,B block pairs of optimal lengths $\alpha_{opt}$, $\beta(\alpha_{opt})$ can be laid down. But the optimal ratio is not always what is needed, as will now be explained.

A test is performed in step S10 to determine whether the current ratio R(B)/R(A) is less than or equal to Q. Since division by 0 is not possible, in step S9 a check is made to see whether R(A) is 0. If it is, it is an indication that there is B material that has to be processed with no corresponding A material, and in such a case the goal is to lay down as much B material as possible while keeping the lily pads—which represent redundancy when there is no corresponding A material—to a minimum. In step S11, L(A) is set equal $\alpha_{opt}$ and L(B) is set equal to $\beta(\alpha_{opt})$. Referring to FIG. 11A, when a lily pad has a length of $\alpha_{opt}$, $\beta(\alpha)$ is equal to the maximum value. In other words, by using $\alpha_{opt}$ as the length of a lily pad, the following section (containing B data) can be the longest possible relative to the length of the A section. The idea is to maximize the ratio $\beta(\alpha)/\alpha$ so that as much B material can be used up while using as little A material as possible.

In step S10, assuming that R(A) is not equal to 0, the ratio of the data remaining in the two lists R(B) and R(A) is formed, and it is compared with Q. Q is the ideal $\beta/\alpha$ ratio, $\beta(\alpha_{opt})/\alpha_{opt}$, and represents the largest data that can be laid out for the least "expense" in redundancy if any R(C) material has to be borrowed. If the ratio R(B)/R(A) is less than or equal to Q, it means that the A and B material can be laid down without borrowing any more lily pads from the following C segment—there is enough A material to do the job. As shown in step S12, the next A data that is laid out, L(A), is set equal to aopt and the next B material that is laid down, L(B), is set equal to the same length $\alpha_{opt}$ multiplied by the ratio of the remaining data in the two lists. In this way, as the process continues, $\alpha_{opt}$ is always taken from list R(A) for placement on the disk followed by an amount of data taken from list R(B) that is less than $\beta(\alpha_{opt})$ but which will result in the B list being depleted at the same time that the A list is depleted. The difference between steps S11 and S12 is that while the data L(A) placed on the disk for the shorter version is always set equal to $\alpha_{opt}$, the data taken from the longer list for L(B) may not be the maximum that could be used for a seamless jump. If there is a great deal of B data, then L(B)=$\beta(\alpha_{opt})$. But if there is less, then less data is taken from list R(B) as shown in step S12.

By the time step S13 is reached, the system has determined the values for L(A) and L(B). The length of L(A) is always made equal to $\alpha_{opt}$ and the data is taken from the R(A) list; L(A) is set without even checking that there is any data available in the R(A) list because in step S7 it was determined that, if needed, R(C) has enough data. In step S13, a check is made to see if there is enough data in R(A) by itself to fulfill the L(A) requirement. The test in step S13 checks whether the data remaining in R(A) is at least equal to $\alpha_{opt}$. If there is enough data in R(A) to fulfill the L(A) requirement, then step S14 is skipped. Otherwise, step S14 is executed. It is in this step that material from the next C segment is advanced and treated as data unique to version A for being laid down as a lily pad in the data block sequence that is read during play of version A. For the reasons discussed in connection with FIGS. 7–9, it is also necessary to take the same material derived from the next C segment and include it in the material that is unique for version B—the basic operating principle of the invention is that whenever material is advanced from a C section for use as an A-material lily pad, that same material must be included in the data that is unique to version B. After the check is made in step S13 whether R(A) is empty or, even if it has some data, does not have enough to fill the L(A) requirement, the difference A between R(A) and L(A) is formed. In the second sub-step, A is added to R(A) so that R(A) now has enough data to satisfy the L(A) requirement. Next, the same amount of data taken from the R(C) list is added to the R(B) list because it must be included in the material unique to version B. Finally, the material advanced from the C segment is deleted from the R(C) list because it will have already being laid down—twice—during processing of the A and B data.

The sub-steps of step S14 are symbolized in FIGS. 7 and 8 which show C material being advanced and included in the unique sequence for each version. This is were the redundancy comes in—a section of common material is deleted, but it is recorded twice instead. That is the price that must be paid for deriving a lily pad which would otherwise not exist, the lily pad serving as a jumping off point for the skip over the following data block that is unique to version B.

Thus in steps S13 and S14 it is determined whether there is enough material in R(A) to support L(A); if there is not, then R(A) is increased (along with R(B)) in step S14, and at the same time R(C) is decreased. A different kind of check and possible correction is required for L(B). The amount of data to be placed on the disk in a block unique to version B is determined in step S11 or S12. In step S15, a check is made to see whether there is enough data in the R(B) list to support L(B). If there is, a jump is made to step S17. On the other hand, if R(B) is less than L(B), then there is not enough data left in the B segment being processed to support the last block, represented by L(B) which is supposed to be placed on the disk. However, there is no need for R(B) to be increased in such a case. L(B) is simply made shorter in step S16; L(B) is set equal to R(B), the data remaining for the current B segment being processed. Any practical system has a minimum block length. When it comes to the block length for the version having less data in the A,B segment pair being processed, a length equal to $\alpha_{opt}$ is always used, as explained in connection with steps S11 and S12. That length will necessarily exceed the minimum length, the minimum length being seen on FIG. 11A to be less than $\alpha_{opt}$. But there is no need for a minimum length for the last block that is unique to version B. That is because this block is placed on the track immediately before the following common data. The read head when playing version B, jumps to the start of the last short B data block, and reads through this block and continues on to the next C block. And when version A is being played, the jump is made to the start of the common material, just after the short B block. Since a jump is not taken from the last B block, there is no minimum length requirement. Consequently, instead of increasing R(B) in step S16 to accommodate L(B), which would be analogous to what is done in step S14 for the A version, L(B) is simply reduced in step S16 to equal the remaining data in the R(B) list.

By the time seep S17 is reached, R(A) has been increased, if necessary, in step S14 by a little bit of C data, and the two data blocks to now be placed on the disk, L(A) and L(B), have also been determined. In step S17, R(A) and R(B) are both reduced by the respective amounts of data that are being placed on the disk, and the data in L(A) and the data in L(B) are formatted.

The easiest way to understand the processing from this point is to consider the usual case in which there are alternate segments A and B to be processed. If B starts off much larger than A, L(A) and L(B) are set in step S11 to maximize the amount of B material that is placed on the disk relative to the A material in the preceding block. In this way, the ratio R(B)/R(A) keeps decreasing. Eventually, if the inequality in step S10 is satisfied, then in step S12 L(B) is set to a lesser value than it is in step S11 during the remaining processing of the A and B segments under consideration. The ratio used in setting L(B) in step S12 is designed so that the R(A) and R(B) lists are depleted simultaneously. In that case, in step S18, R(A) and R(B) will both be depleted during the same iteration. On the other hand, if B starts off so much larger than A—for example, there may be no A segment corresponding to a B segment— then even maximizing the ratio of the data laid out for the β,α pair in step S11 may not result in R(A) and R(B) both becoming nulled in the same iteration. What happens in such a case is that R(A) gets reduced to 0, assuming that it did not start there in the first place with the processing of a B segment that has no corresponding A segment, and it takes longer for R(B) to be depleted to the point where there is no data left in the list (represented by R(B)=0 in step S18). Thus, R(A) is always depleted either during the same iteration with R(B) or an earlier iteration, but never during an iteration following the depletion of R(B).

Let us first consider the case in which R(A) is depleted first. It will be recalled that R(A) is increased in each iteration during step S14 so that there is enough data in the list to fill the L(A) requirement. But in the same step R(A) is depleted once again as the data is stored on the disk. In such a case, the system must continue to lay down chunks of the B data while borrowing from the C segment for the A lily pads (and also adding the borrowed material to the R(B) list that must be processed). While every execution of seep S18 reveals that R(A)=0, since R(B) is not 0 a branch is made to step S19. At this point in the processing, there is still B material that must be taken care of, and possibly A material as well. But before the next iteration can begin, it must be ensured that there is enough C material left in the R(C) list to satisfy the next L(A) requirement. In other words, if an A block has to be placed on the disk and the material for the lily pad has to come at least partially from the C segment then being processed, there must be enough data left in the C segment for this to be accomplished. The test in step S19 is thus the same as the test in step S7. If there is enough material left in R(C) to satisfy the $\alpha_{opt}$ requirement, i.e., the sum of R(A)+R(C) is not less than $\alpha_{opt}$, then a return is made to step S9. Since there is enough available data, the iteration continues with steps S9–S12, and the derivation of L(A) and L (B).

On the other hand, suppose that R(A)+R(C) is less than $\alpha_{opt}$. This means that there is not enough data in R(C) to allow borrowing of an amount which when added to R(A) will equal $\alpha_{opt}$ during step S14. A return is made to the start of the main processing loop, step S3, which implements what is shown in FIG. 9. The last bit of the C material, C4 in FIG. 9, is added to the end of the preceding A and B material left to be processed. This can be done because the preceding C material (C1, C2 and C3 in FIG. 9) has already been placed at the tail end of the preceding A and B segments being processed. Even in the case of the B segment which has not been fully laid down, all that is necessary is to place the last bit of the C segment at the end of what is already in the R(B) list. Placing C4 at the end of the current R(A) and R(B) is tantamount to merging the current A segment (if anything is left in it) with the following A segment, and the current B segment with the following B segment, since all of the C material separating them will have already been accounted for. So as shown in FIG. 9, C4 is added at the beginning of the next A segment, and it is added at the end of the current B segment (R(B)), which includes the preceding R(C) blocks C1–C3 that were added to R(B)), following which the next B segment is added to R(B). Finally, R(C) simply becomes the next C segment.

The processing continues with outer-loop returns to step S3 and inner-loop returns to step S9. Eventually the processing ceases when in step S4 it is determined that there is no more data.

The invention has been described in terms of an illustrative embodiment having only two versions of a program. But the method of the invention has much more widespread utility. For example, consider a multimedia disc whose subject is American Presidencies and, following play of a segment on wars in general, a branch may be made to a segment on any President in whose administration America was at war. The segments on Roosevelt and Truman may contain common subject matters at their beginnings and elsewhere and both segments may be far away from the segment from which the branch is being taken. Common material may be recorded redundantly as described above to create lily pads for seamless jumps to these two video segments, while the same thing is done for still other paired-President video segments. There is no reason to restrict jumps over only two kinds of materials—there may be dozens or even hundreds, and in both directions, if extensive branching based on user selections are allowed. Similarly, three or more video segments which share common material may have that common material recorded three or more times in lily pads associated with the three or more individual video segments if necessary to allow for seamless branching. The common denominator in all cases is that material which is common to at least two programs or two program segments is redundantly recorded—at the expense of "real estate"—in order to allow seamless play to take place.

While the focus herein has been on reducing redundancy to a minimum, some slack is allowable. It is not necessary to squeeze out every possible millimeter of bit capacity. Thus, while the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A method for interleaving data on a recording medium for seamless play of at least two program versions A and B of source material, the medium being playable on a player having a predefined data buffer management system; the data representing A-type segments of A-version source material, B-type segments of B-version source material, and C-type segments of source material common to both of said at least two versions; and wherein data is to be interleaved on said medium to represent A-type and B-type paired segments disposed between successive C-type segments, with data representing C-type segments being read no matter which version of the source material is being played and data representing only A-type or only B-type segments being read depending on which version of the source material is being played; comprising the steps of:

(a) dividing data representing each A-type segment and each B-type segment in a pair into two series of data blocks;

(b) interleaving in a single series the data blocks in the two series of step (a);

(c) following the interleaved A-type and B-type data blocks of step (b) for a pair of A-type and B-type segments by data blocks representing just the following C-type segment; and (d) limiting the lengths of the individual A-type and B-type data blocks to allow the player on which the medium is played to skip over A-type data blocks without interruptions when version B of the source material is played, and to skip over B-type data blocks without interruptions when version A of the source material is played.

2. A method in accordance with claim 1 wherein a series of interleaved data blocks begins and ends with a data block representing the longer of the two segments in the respective pair.

3. A method for interleaving data on a recording medium for seamless play of at least two program versions A and B of source material, the medium being playable on a player having a predefined data buffer management system; the data representing A-type segments of A-version source material, B-type segments of B-version source material, and C-type segments of source material common to both of said at least two versions; and wherein data is to be interleaved on said medium to represent A-type and B-type paired segments disposed between successive C-type segments, with data representing C-type segments being read no matter which version of the source material is being played and data representing only A-type or only B-type segments being read depending on which version of the source material is being played; comprising the steps of:

(a) dividing data representing each A-type segment and each B-type segment in a pair into a single series of interleaved data blocks;

(b) limiting the lengths of the individual A-type and B-type data blocks to allow the player on which the medium is played to skip over A-type data blocks without interruptions when version B of the source material is played and to skip over B-type data blocks without interruptions when version A of the source material is played; and (c) following the interleaved A-type and B-type data blocks by data blocks representing just the following C-type segment.

4. A method in accordance with claim 3 wherein a series of interleaved data blocks begins and ends with a data block representing the longer of the two segments in the respective pair.

5. A medium for representing at least two program versions A and B of source material, the medium being playable on a player having a predefined data buffer management system;

(a) the data on the medium representing A-type segments of A-version source material, B-type segments of B-version source material, and C-type segments of source material common to both of said at least two versions, with the medium being adapted to be played on a player which reads data representing C-type segments no matter which version of the source material is being played and data representing only A-type or only B-type segments depending on which version of the source material is being played;

(b) data being interleaved on said medium to represent A-type and B-type paired segments disposed between successive C-type segments, with data representing each A-type segment and each B-type segment in a pair being divided into a single series of interleaved data blocks with the lengths of the individual A-type and B-type data blocks being limited to allow the player on which the medium is played to skip over A-type data blocks without interruptions when version B of the source material is played and to skip over B-type data blocks without interruptions when version A of the source material is played;

(c) with each series of interleaved A-type and B-type data blocks being followed by data blocks representing just the following C-type segment.

6. A medium in accordance with claim 5 wherein a series of interleaved data blocks begins and ends with a data block representing the longer of the two segments in the respective pair.

7. A method for formatting on a playable medium digital data representing at least two versions of a program comprising the steps of:

(a) interleaving in a single data stream data sequences which are unique to each version and data sequences which are common to the two of them; and (b) in order to achieve seamless play of both versions on a player that is compatible with the medium but has limited buffer storage, limiting the lengths of the data segments which are unique to each version to allow the player on which the medium is played to skip over the data sequences unique to the other version without interruptions.

8. A playable medium formatted with digital data representing at least two versions of a program comprising:

(a) a single data stream containing interleaved data sequences which are unique to each version and data sequences which are common to the two of them; and (b) in order to achieve seamless play of both versions on a player that is compatible with the medium but has limited buffer storage, the lengths of the data sequences which are unique to each version are limited to allow the slaver on which the medium is played to skip over the data sequences unique to the other version without interruption.

* * * * *